April 9, 1940.　　　C. H. WHITE　　　2,196,485
OFFSET DISK HARROW
Filed Oct. 2, 1936　　　4 Sheets-Sheet 1

INVENTOR
Charles H. White,
BY
Brown, Jackson, Boettcher & Dienner
ATTORNEYS.

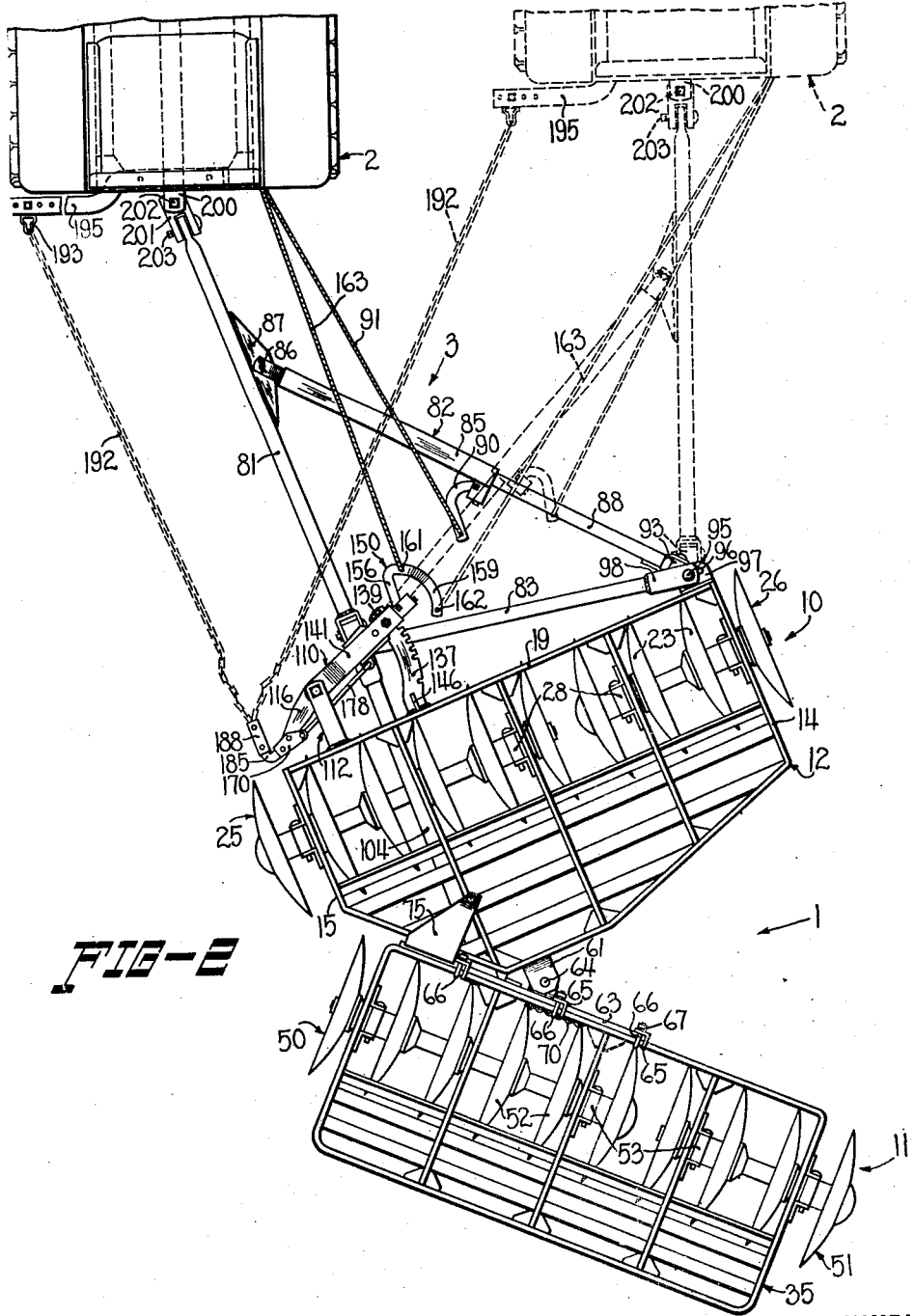

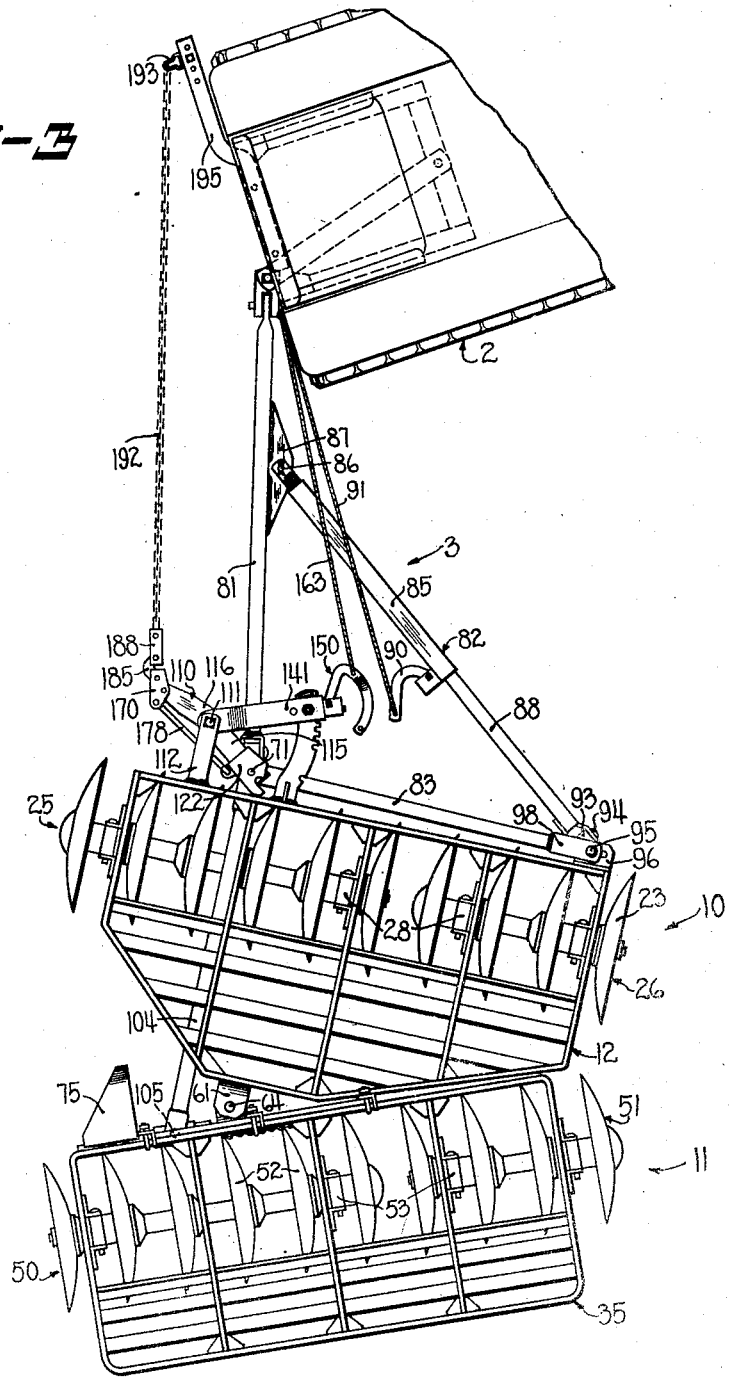

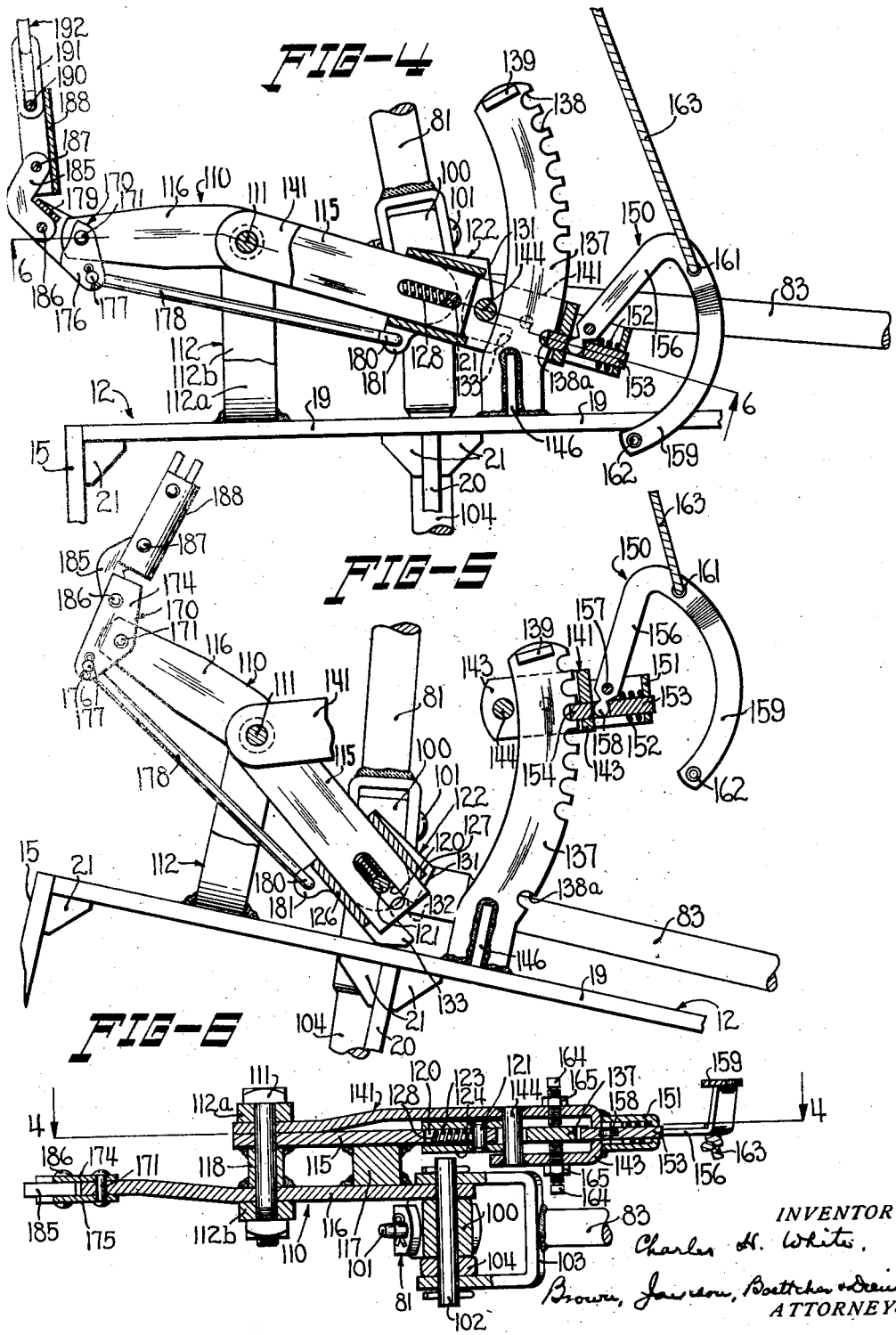

Patented Apr. 9, 1940

2,196,485

UNITED STATES PATENT OFFICE 2,196,485

OFFSET DISK HARROW

Charles H. White, Moline, Ill., assignor to Deere & Company, Moline, Ill., a corporation of Illinois Application October 2, 1936, Serial No. 103,641

31 Claims. (Cl. 55—83)

The present invention relates generally to agricultural implements, and is more particularly concerned with certain new and useful improvements in offset tractor disk harrows of the type especially adapted to orchard use inasmuch as the harrow can be operated under the branches, close to the trees, but with the tractor or other source of draft disposed to one side of the trees where it will not damage the fruit or foliage. Such implements are, however, not limited to orchard use but are capable of doing field work generally.

The principal object of the present invention is the provision of a disk harrow of the above type in which the two gangs can be locked or latched in the desired angled position, but which can be released from said latching mechanism and angled in the other direction with a positively exerted force which acts against one gang and reacts against the other when the tractor is turned.

A further object of the present invention is the provision of mechanism for causing the gangs to return automatically to their operating angled position after having been angled in the opposite direction to provide for making a turn in that direction.

Usually the implement is offset to the right, and by properly setting the angular relation between the front and rear gangs, the side draft on the tractor can be practically eliminated even when the implement runs in offset position, as is well known. Normally the machine is turned to the left, since the two gangs tend to roll in this direction about the point of intersection of their axes, but when it is desired to make a turn in the opposite direction, away from the vertex of the angle between the two gangs, it is desirable to angle the gangs in the opposite direction, so that their natural tendency is to roll in that direction, thereby facilitating making the turn. However, as soon as the turn in this direction is completed, it is essential to have the gangs return to their normal angular relation without requiring the operator to dismount or make any adjustments before resuming operation. According to the principles of the present invention, turning the tractor away from the vertex of the angle between the two gangs in their normal operating position automatically angles the gangs in the opposite direction, but as soon as the turn has been completed in this directon, the gangs are automatically returned to their operating angle without disturbing the adjusting mechanism for fixing or determining the angle between the gangs when in operating position.

These and other objects and advantages of the present invention will be apparent to those skilled in the art after a consideration of the following detailed description of the preferred embodiment, taken in conjunction with the accompanying drawings.

In the drawings:

Figure 2 is a plan view of the harrow with the gangs disposed in an offset operating position;

Figure 3 is a plan view of the harrow with the gangs disposed in a right-hand turning position;

Figure 4 is an enlarged horizontal fragmentary view, taken along the line 4—4 of Figure 6, of the locking mechanism in a transporting position;

Figure 5 is a fragmentary view of the locking mechanism in a right hand turning position; and Figure 6 is a sectional view taken as indicated by the line 6—6 of Figure 4.

Figure 1:
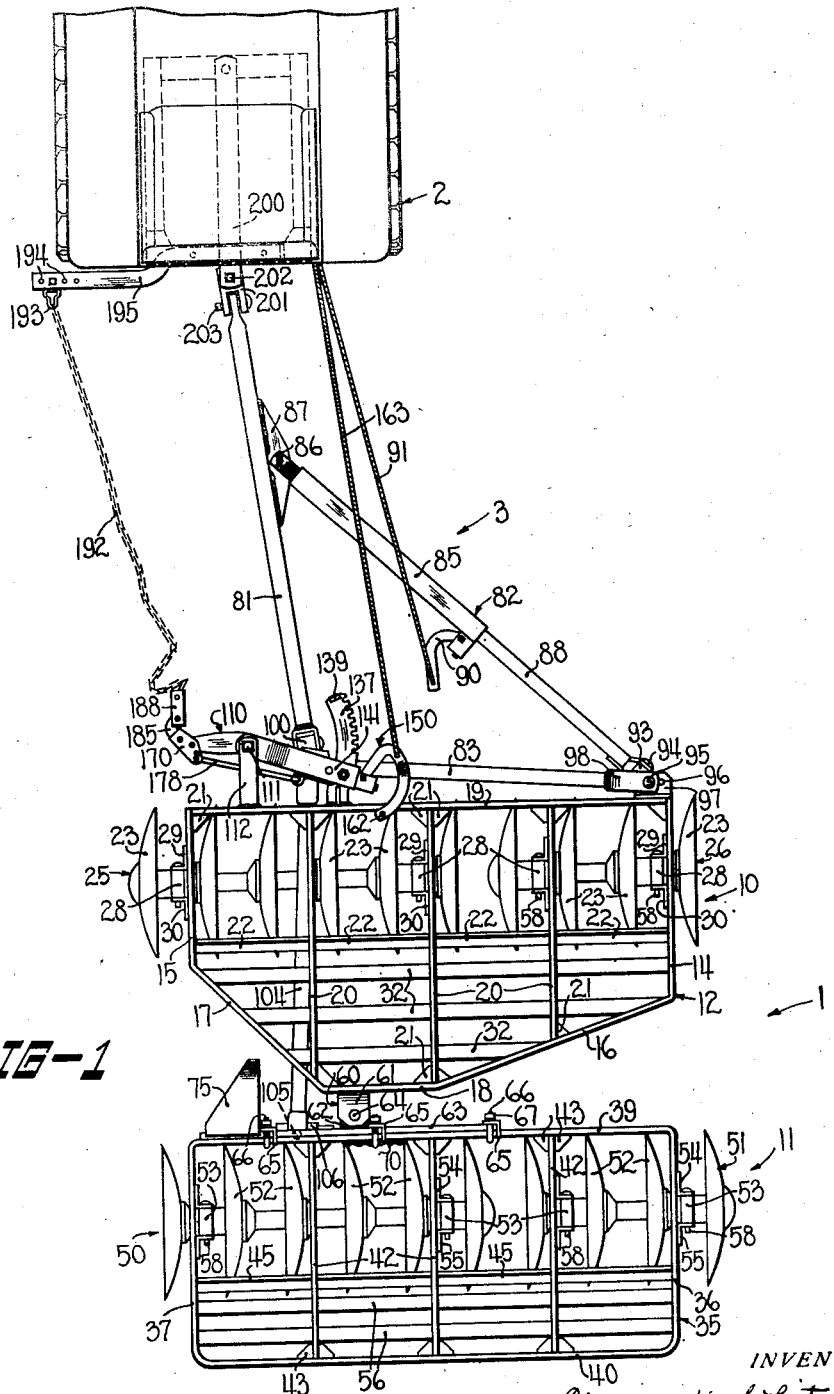
Figure 1 is a plan view of a disk harrow of the tandem offset type embodying the principles of the present invention, with the front and rear gangs thereof disposed in a transport position.

Referring now more particularly to Figure 1, which shows the implement in transport position, the harrow is indicated in its entirety by the reference numeral 1 and is adapted to be propelled by a tractor 2 through a suitable hitch frame 3. The harrow comprises the usual front or leading gang 10 and the rear or trailing gang 11. The front gang 10 includes a frame 12 which comprises parallel side members 14 and 15 which converge laterally inwardly and rearwardly, as at 16 and 17, respectively, to a transverse rear portion 18. The front bar of the frame 12 comprises a transverse member 19 which is connected with the inwardly converging portions 16 and 17 and with the rear portion 18 by means of longitudinal bars 20 that are arranged parallel to the side members 14 and 15. Preferably, although not necessarily, the ends of the transverse bar 19 are welded to the forward ends of the longitudinal bars 14 and 15, and similarly the ends of the intermediate bars 20 are welded to the front bar 19 and the frame portions 16, 17 and 18. The frame is strengthened by reenforcing gussets 21, and transverse bars 22 are welded or otherwise secured to the frame bars 14, 15 and 20 and are disposed in a position to carry disk scrapers or other means for cleaning the disks, the latter being indicated at 23. Preferably the disks are arranged in axially aligned gang sections 25 and 26, respectively, such sections being supported for rotation in bearings 28 carried at the lower ends of bars 29 and 30, the upper ends of which are welded to the associated frame bars. The rear portion of the forward gang 10 is provided with a number of transverse bars 32 suitably welded or otherwise secured to the frame bars so as to form a rack for carrying stones or other weights for causing the desired penetration of the disks when operating in hard soil where the weight of the harrow alone is not sufficient to secure the desired depth of operation.

The frame for the rear gang 11 is indicated at 35 and comprises parallel side members 36 and 37 and transverse members 39 and 40 arranged in rectangular fashion. The front and rear bars or members 39 and 40 are connected by intermediate bars 42 which are preferably, although not necessarily, welded to the front and rear frame members 39 and 40 and reenforced by suitable gussets 43. Scraper bars 45 are welded in between the frame bars 36 and 37 and the intermediate bars 42. Scrapers (not shown) are carried on the bars 45. The rear gang 11 includes two disk gang sections 50 and 51, each having a plurality of disks 52 disposed in axial alignment, as in conventional practice, and carried by bearings 53 secured at the lower ends between angles 54 and 55. Transverse bars 56 are welded to the frame, and intermediate bars serve to provide for the application of additional weight to the rear gang. Pins 58 are provided for holding the bearings of both gangs in position.

The rear gang frame 35 is coupled to the front gang frame 12 by means of a pivot coupling that is indicated in its entirety by the reference numeral 60. The coupling 60 comprises a vertically disposed U-shaped bracket 61 welded to the transverse rear portion 18 of the front frame 12, and a similar vertically disposed U-shaped bracket 62 that is welded to the forward face of an adjustable rear gang connecting bar 63. A pivot pin 64 connects the upper and lower arms of the two brackets 61 and 62 so as to provide for lateral swinging of one gang with respect to the other, but all relative vertical movement is prevented.

The rear gang is adjustable laterally relative to the front gang so as to cause the rear disks to cut out the ridges formed by the front gang and to throw the soil displaced by the front gang back in the opposite direction, leaving the ground level. This adjustment is provided by shifting the position of the front frame bar 39 with respect to the connecting bar 63. The bar 63 has vertical angles 65 welded or otherwise secured thereto. One leg of each of the angles 65 is notched to embrace the frame bars 39 and 63, and the other leg of each of the angles 65 is apertured to receive a clamping U-bolt 66. The U-bolts 66 straddle the bars 39 and 63 and are adapted to clamp the bar 63 rigidly in position when the nuts 67 are tightened. In order to retain the desired lateral adjustment, a corrugated strip 70 is welded to the inside of the front frame member 39 of the rear gang adjacent the position of one of the clamping U-bolts 66, said bolts engaging in one of the grooves of the corrugated member 70 to hold the bars 39 and 63 against lateral displacement. The rear gang connecting bar 63 has a plate 75 welded to the top side thereof which, in an operating position as shown in Figure 2, overlies the bar 17 of the front gang 12 and reduces the stresses imposed on the pin 64 while the harrow is in an operating position.

The rear gang 11 may be adjusted laterally relative to the front gang 10 by loosening the nuts 67 on the U-bolts 66 and shifting the rear gang so as to bring the U-bolt associated with the corrugated strip 70 to another groove therein. The nuts 67 are then tightened.

The hitch frame 3, by which the tractor 2 draws the implement 1, comprises a primary longitudinal draft member 81, an adjustable draft yoke 82, and a transverse rear hitch member 83, forming a generally triangular hitch frame, as will be seen from Figures 1, 2 and 3. The draft yoke 82 includes a sleeve section 85 pivotally connected, as at 86, to a plate 87 welded or otherwise rigidly secured to the draft member 81 adjacent the forward end thereof. Slidable in the sleeve member 85 is a bar or draft yoke section 88 which is notched (not shown) or otherwise formed to receive detent mechanism carried at the rear end of the sleeve section 85 and controlled by a latch lever 90. A rope 91 extends from the tractor 2 to the lever 90 so that the operator can control the latter from his position on the tractor. The latch mechanism 90 is used to increase or decrease the length of the draft yoke 82 so as to determine the amount of offset. The rear end of the draft yoke member 88 is pivotally connected to a universal joint member 93 by a pin 94, and the member 93, in turn, is pivoted on a vertical pin 95 that is disposed in a slot 96 formed in a bracket 97 fixed to the forward frame bar 19 of the front frame 10. The right hand end (Figure 1) of the transverse bar 83 is provided with a yoke section 98 which receives the pin 95 by which the member 83 is also connected to the bracket for lateral movement by virtue of the disposition of the pin 95 in the slot 96.

The rear end of the primary draft member 81 is pivoted to a universal joint member 100 by means of a pin 101, and the universal joint member 100 receives a pin 102 (Figure 6) to which the transverse rear hitch member 83 is pivoted, as by a yoke 103. A hitch bar 104 (Figures 1 and 6) is also pivoted at its forward end to the pin 102 and extends rearwardly and is pivotally connected, as at 105, to the front frame bar of the rear gang 11 to the left of the pivot 64 between the gangs. Preferably a plate 106 is welded to the rear gang connecting bar 63 between the two outer vertical angles 65, and the plate 106 is apertured to receive the pivot 105. Draft, by virtue of the forward travel of the tractor 2, can thus be transmitted by the draft frame 3 to the right hand end of the forward gang 10 (Figure 1) and to the left hand end of the rear gang 11. The resistance of the soil against the disks 23 and 52 causes the gangs to take an angular position with respect to one another, as illustrated in full lines in Figure 2. The mechanism for controlling the angular positions of the gangs 10 and 11 will now be described.

A gang angling lever 110 is pivoted on a bolt or pin 111 carried at the forward end of the bracket 112 welded or otherwise secured to the left end of the front frame bar 19 of the front gang 10. As best shown in Figures 4 and 5, the bracket 112 is in form of a U-shaped member having its intermediate portion welded to the frame bar 19 and with its ends or arms 112a and 112b (Figure 6) extending forwardly so as to provide an adequate support for both the upper and lower ends of the pivot 111. The gang angling lever 110 comprises an upper bar 115 and a lower bar 116 which are secured together in parallel relation by spacers 117 and 118, the latter being apertured and receiving the pivot bolt 111. The spacers 117 and 118 are welded or otherwise secured to the upper and lower bars 115 and 116. The right hand or inner end of the lower bar 116 is apertured and receives the upper end of the pivot pin 102 that connects the rear gang draft bar 104 to the hitch frame bars 81 and 83. The pin 102 thus connects the four parts 81, 83, 104 and 110 together for relative pivotal movement about an axis defined by the pivot pin 102. The upper bar 115 of the gang angling lever 110 is provided with a slot 120 (Figure 5) and receives a pin 121 that forms a part of a latch indicated in its entirety by the reference numeral 122. This latch is slidably mounted on the right hand or inner end of the bar 115 and includes upper and lower plates 123 and 124 (Figure 6) that are secured together in parallel relation by spacers 126 and 127 (Figure 5). Preferably, the pin 121 that is disposed in the slot 120 is in the form of a rivet (Figure 6) for the purpose of holding the latch parts together. The pin 121 is yieldingly held at the outer end of the slot 120 by a spring 128, and the upper and lower plates 123 and 124 have their ends formed with a cam surface 131, an inwardly extending notch 132, and a stop finger 133 (Figure 5), so as to provide for a releasable connection with angling adjusting mechanism that is described below.

The aforesaid angling adjusting mechanism embodies a sector 137 welded at its inner end to the front frame bar 19 and having its forward end curved and notched, as at 138, and is provided with a stop 139. A latch lever 141 (Figures 1 and 6) is pivoted to the bolt 111 above the gang angling lever 110, and the opposite end of the latch lever 141 is bent back on itself, as at 143 in Figure 6, to embrace the sector 137. A pin 144 is carried by this portion of the latch lever 141 and is disposed on the side of the sector 137 adjacent the latch 122 on the upper bar 115 of the gang angling lever 110 in a position to be engaged by the latter, as indicated in Figure 4. When the latch 122 is locked to the latch lever 141, as when the pin 144 is disposed in the notch 132, the two parts 110 and 141 are adapted to move together or to be held against movement in any position in which the latch lever 141 is locked. The sector 137 is reenforced by triangular pieces 146 welded or otherwise secured to the frame bar 19 and the sector 137.

The latch lever 141 carries releasable detent mechanism indicated in its entirety by the reference numeral 150 and, as best shown in Figures 4, 5 and 6, comprises a bracket 151 welded to the end 143 of the latch lever 141 and enclosing a spring 152 which encircles a pawl member 153 that is slidably mounted in suitable apertures formed in the bracket 151 and in the intermediate portion 143 of the lever 141. The pawl 153 includes an end 154 that is adapted to engage in one of the notches 138, or in the transport notch 138a on the sector 137. The pawl is controlled by a lever 156 that is pivoted at 157 on the bracket 151 and has a rounded end 158 disposed in an opening in the pawl 153, whereby rocking movement of the lever 156 moves the pawl 153 into and out of the notches on the sector 137. An extension 159 is formed on the lever 156 and is generally arcuate about the pivot 157 and is provided with two openings 161 and 162 for the optional reception of a tripping rope or cable 163 that extends forwardly to the operator's position on the tractor 2. The spring 152 normally urges the pawl 153 inwardly to engage one of the notches of the sector 137, but when the operator pulls on the rope 163 the lever 156 is swung about its pivot 157 and releases the pawl 153 from the sector 137, whereupon the latch lever 141 and the gang angling lever 110 are free to swing about their pivot 111 within the limits (Figures 1 and 2) defined by the stop 139 and the reenforcing plate 146, which also serves as a stop for the latch lever 141, but not for the gang angling lever 110 when it is released from the latch lever 141 (Figures 3 and 5). The swinging movement of the latch lever 141 is guided by a pair of set screws 164 (Figure 6) threaded into the end portion 143 of the latch lever 141. The set screws are locked in adjusted position by lock nuts 165.

The slidable latch 122 on the upper bar 115 of the gang angling lever 110 is controlled by a short lever 170 pivotally mounted, as at 171, on the left hand end of the bar 116. The lever 170 comprises upper and lower bars 174 and 175 (Figure 6), each having an end 176 (Figures 4 and 5) receiving a pivot pin 177 to which one end of a link 178 is connected, and stop plate 179. The opposite end of the link 178 is provided with an end 180 disposed in an opening in a lug 181 carried on the slidable latch 122 and bent backwardly to form a hook to retain the link 178 in position. As is obvious, swinging motion of the lever 170 about its pivot 171 acts through the link 178 to slide the latch 122 on the inner end of the gang angling lever bar 115. An angle link member 185 is pivoted, as at 186, between the plates 174 and 175, and the opposite end of the angle member or link 185 is pivoted, as at 187, to a U-shaped piece 188. The member 188 carries a pivot 190 receiving the rear link 191 of the chain 192 that extends forwardly from the gang angling lever 110 to the tractor 2. The forward end of the chain is received in a bracket 193 carried in one of the openings 194 in a turning bar 195 that is rigidly secured to the rear end of the tractor and extends laterally outwardly, to the left, as viewed in Figure 1. The tractor 2 is provided with the usual swinging drawbar 200 which carries, at its rear end, a clevis 201 which is fastened to the drawbar by a vertical pivot 202. The clevis 201 includes a horizontal pivot 203 receiving the forward end of a longitudinal draft member 81. The above described arrangement of the links 185 and 188 provides the equivalent of a lever of sufficient length to operate the lever 170 that slides the latch 122 in either position of the tractor (Figure 2), as will be described.

The operation of the machine described above is substantially as follows:

Figure 1 shows the machine arranged in inoperative or transport position. The disks 23 and 52 roll in a straight line substantially directly behind the tractor, and the gangs 10 and 11 are rigidly locked in this position by virtue of the fact that the pawl 153 (Figure 4) is held in the transport notch 138a of the sector 137, and the slidable latch 122 holds the gang lever 110 locked to the pin 144 carried on the latch lever 141. Thus, the forward movement of the tractor 2 produces a forward pull on the implement 1 at the pivots 95 and 102 (Figure 6), and the pull at the latter point is transmitted to the rear gang 11 by the draft bar 104 and to the left hand end of the front gang 10 by virtue of the fact that the levers 110 and 141 are locked against swinging movement as described above. When the field has been reached and it is desired to angle the gangs 10 and 11 into their operating position (full lines, Figure 2), the operator exerts a pull on the rope 163, and this swings the pawl lever 156 in a counterclockwise direction (Figures 1 and 4) and disengages the pawl 153 from the sector 137. As indicated in Figure 1, at this stage the chain 192 is slack and the spring 128 keeps the slidable latch 122 in locked relation to the latch lever 141 upon which the pawl 153 is carried. As soon as the pawl 153 is released, the forward movement of the tractor then exerts a pull at the pivot 95 on the right hand end of the front gang 20 and, through the draft bar 104, on the left hand end of the rear gang 11. Since the gang angling lever 110 and the latch lever 141 are freed from the sector 137, the pivot 102 between the forward end of the draft bar 104 and the hitch frame 3 is free to move forwardly relative to the left hand end of the gang 10. The resistance of the soil against the front disks 23 therefore causes the front gang 10 to turn in a counterclockwise direction, and the receding movement of the pivot 64 between the front and rear gangs then permits the rear gang to swing in an opposite direction, clockwise as viewed in Figure 1, the gangs 10 and 11 taking the position shown in Figure 2. The implement as a whole then swings to the right, since the pressure of the soil against the rear disks 52 causes the gangs to swing outwardly until the pressure of the soil against the forward disks 23, which tends to cause the front gang to run inwardly, substantially balances the outward pressure of the soil against the rear disks. At this stage, the implement 1 is propelled forwardly in an offset position but without introducing any substantial side draft stresses on the tractor 2. The amount of offset is governed by the effective length of the draft coupling 85, this being under the control of the operator through the cable 91. For example, if the operator desires a greater amount of lateral offset than is shown in Figure 1, he exerts a pull on the cable 91 and this releases the latch and permits the coupling 85 to be extended farther. The implement as a whole then swings in a clockwise direction, and the increased angle at which the rear disks 52 operate then causes the implement to be deflected laterally outwardly an increased amount.

The angle between the gangs 10 and 11 is controlled by the latch lever 156. In shifting the gangs from the position shown in Figure 1 toward the position shown in Figure 2, the operator initially releases the pawl 153 by pulling on the rope 163 and the forward draft swings the gang angling lever 110 and the latch lever 141 from the position shown in Figure 1 toward the position shown in Figure 2, as described above. As soon as the operator sees that the gangs have been angled the desired extent, he releases the pull on the cable 163, and the pawl 153 is then engaged in one of the operating notches 138, thereby locking the two levers 110 and 141 to the front frame. This also locks the pivot pin 102 against any further swinging so that at this stage of operation the two gangs 10 and 11 are rigidly connected to the hitch frame to prevent any lateral swinging movement. However, the implement 1 as a whole can swing about the pivot 202 on the tractor into a laterally offset position under the influence of the soil pressure against the oppositely disposed disks 23 and 52 as described above.

In normal operation, the machine is usually turned at the end of the field by swinging the tractor to the left, this being in the direction in which the angled gangs 10 and 11 naturally roll. The machine can thus be turned in this direction without changing any of the adjustments or releasing any of the hitch connections.

Under certain conditions, however, it may be desirable to turn the machine toward the right instead of to the left, and since this movement is against the natural tendency of the disks to roll in the opposite direction, the above described hitch connections are such that the gangs 10 and 11 can be temporarily angled in the opposite direction to accommodate the aforesaid right hand turn but without losing the angle adjustment setting of the latch lever 141. Referring now to Figures 2 and 3, if the tractor 2 should be turned to the right (Figure 3), the turning bar 195 exerts a pull on the chain 192. This pull takes up the slack in the chain 192 and then swings the lever 170 (Figure 4) about its pivot 171. This exerts a pull on the link 178 which is sufficient to compress the spring 128 and release the slidable latch 122 from the pin 144 on the latch lever 141. Thus, the gang angling lever 110 is freed from its connection to the angle adjusting lever 141, and as soon as this connection is released, the pull on the chain 192 swings the lever 110 in a clockwise direction about the pivot 102 on the hitch frame 3. This forward swinging movement of the gang angling lever 110, considering the hitch frame 3 at the instant as being a stationary part, acts through the pivot 111 and the bracket 112 to swing the front gang in a clockwise direction about its pivotal connection 95 with the hitch frame 3 into the position shown in Figure 3. This swinging movement of the front gang 10, however, acts through the pivot 64 and swings the rear gang 11 in a counterclockwise direction about its pivotal connection 105 with the draft bar 104, whereby the pull on the chain 192 when the tractor 2 makes a right hand turn acts through the lever 110 against one of the gangs and reacts against the other to force the gangs into an oppositely angled position, shown in Figure 3, with a positive force that is entirely independent of soil pressure against the disks. However, as soon as the right hand turning movement is terminated, the pull on the chain 192 is relaxed, and the pressure of the soil against the gangs 10 and 11 causes them to swing back about the pivots 95 and 105, respectively, into the position shown in Figure 2, the gang angling lever 110 then swinging about its pivot 111 until the cam surface 131 (Figure 4) on the slidable latch 122 rides over the pin 144 and the spring 128 then forces the latch 122 into notched engagement with the pin. The length of the portion 133 of the slidable latch 122 is sufficient to prevent the gang angling lever 110 from swinging forwardly beyond the latch lever 141. It will thus be observed that turning the tractor to the right automatically releases the gangs from their angling adjustment, by virtue of the lever 141, but as soon as the right hand turn is completed, the gangs are automatically restored to their originally adjusted position by virtue of the reengagement of the gang angling lever 110 with the angling adjusting lever 141 whose setting, under the control of the lever 143, is not changed during such right hand turn. It is also to be noted that it is not necessary to interrupt the forward travel of the machine during such right hand turn, nor is it necessary to interrupt the continued forward travel of the machine in restoring the gangs to their initially offset operating position.

The implement 1 may also be operated in a left hand offset position (dotted lines, Figure 2) by removing the three pins 95, 102 and 202, which connect the hitch frame 3 to the implement and to the tractor, and reversing the longitudinal draft member 81 and the coupling 82. For convenience of illustration, the tractor is shown in Figure 2 as shifted to the right, rather than the implement shifted to the left, as would actually occur, these two offset positions of the tractor and the harrow being relative. The reversed draft beam 81 and coupling 82 are then connected between the tractor and the implement in the position shown in dotted lines, and then the machine can be operated in substantially the same manner as described above. It is preferable, however, to fasten the rope 163 in the other hole 162 so that enough leverage can be obtained to operate the latch mechanism 150. No change is necessary in the chain 192, other than to adjust the length thereof, since a more acute pull on the chain 192 against the angle link 185 merely brings the same up against the stop 179 at the outer end of the short lever 170, whereupon the effective lever arm at which the pull on the chain 192 swings the short lever 170 extends from the pivot 187 to the pivot 171 (Figure 4), and this is sufficient to cause the pull on the chain 192, even though it is at a more acute angle relative to the gang angling lever 110, to release the slidable latch 122 from the angle adjusting lever 141.

While I have described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. A tractor propelled implement comprising front and rear gangs pivotally connected together, a releasable latch lever pivoted on one of said gangs for fixing said gangs in one angled position, a gang angling lever pivoted coaxially with said latch lever and connected with the other gang, means releasably connecting said gang angling lever with said latch lever, and a turning bar on the tractor connected with said gang angling lever so as to swing said gangs into an oppositely angled position whenever said connecting means is released and the tractor steered to swing said turning bar forwardly.

2. A tractor propelled implement comprising front and rear gangs pivotally connected together, hitch mechanism pivotally connected to the tractor and to the front gang adjacent one end and to the rear gang adjacent the end thereof at the side of the implement opposite said one end of the front gang, an adjustable latch lever pivotally mounted on the front gang, a gang angling lever pivoted on the front gang coaxially with said latch lever and releasably connecting said hitch mechanism to said latch lever for fixing the operating position of the gangs when angled in one direction, and means for releasing said gang angling lever from said latch lever and to force said gangs into an oppositely angled position.

3. A tractor propelled implement comprising front and rear gangs pivotally connected together, hitch mechanism pivotally connected to the tractor and to the front gang adjacent one end thereof, a longitudinally extending bar pivotally connected to said hitch mechanism opposite the point of connection with the front gang, said bar being pivotally connected at its rear end to the rear gang at a point spaced from the axis of pivotal connection of said gangs, a gang angling lever pivotally connected at its intermediate portion to the front gang and at one end to said hitch mechanism adjacent the forward end of said bar, an adjustable latching member mounted on the front gang and movable to a plurality of positions, releasable means for connecting and disconnecting said gang angling lever with said latch member, and means connecting the opposite end of said gang angling lever with said tractor so that turning of the latter in one direction after said releasable means has been released will positively force said gangs into an angled position to accommodate said turning of the tractor.

4. A disk harrow comprising front and rear gangs pivotally connected together for movement into and out of angled positions, a generally triangular hitch frame having one side pivoted to one end of the front gang and the other side pivotally connected with the opposite end of the rear gang, a latch lever pivotally anchored to the front gang and connected with said other side of the hitch frame, and detent mechanism mounted on said latch lever for fixing the latter to the front gang and cooperating with said hitch frame to determine the angled position of said gangs.

5. A disk harrow comprising front and rear gangs pivotally connected together for movement into and out of angled positions, a generally triangular hitch frame having one side pivoted to one end of the front gang and the other side pivotally connected with the opposite end of the rear gang, a latch lever pivotally anchored to the front gang and connected with said other side of the hitch frame, detent mechanism mounted on said latch lever for fixing the latter to the front gang and cooperating with said hitch frame to determine the angled position of said gangs, and means for temporarily releasing the connection between said hitch frame and said lever.

6. A disk harrow comprising front and rear gangs pivotally connected together for movement into and out of angled positions, a generally triangular hitch frame having one side pivoted to one end of the front gang and the other side pivotally connected with the opposite end of the rear gang, a latch lever pivotally anchored to the front gang and connected with said other side of the hitch frame to adjust the position of the front gang relative thereto, a notched sector fixed to said front gang, and releasable detent means carried by said latch lever and engageable with said sector for holding both gangs in an angled position.

7. A disk harrow comprising front and rear gangs pivotally connected together for movement into and out of angled positions, a generally triangular hitch frame having one side pivoted to one end of the front gang, a bar movable relative to the forward gang and connecting the other side of said hitch frame to the rear gang on the side of the pivot between said gangs opposite said one side of the hitch frame, a gang angling lever pivoted to said front gang, means pivoting the forward end of said bar to said lever, and releasable latch means for holding said lever in position.

8. A disk harrow comprising front and rear gangs pivotally connected together for movement into and out of angled positions, a generally triangular hitch frame having one side pivoted to one end of the front gang, a bar pivoted at its forward end to the other side of said hitch frame and at its rear end to the rear gang, a gang angling lever pivoted to the front gang and receiving the pivot between said bar and the hitch frame, and means for swinging said lever to angle said gangs.

9. A tractor propelled implement comprising front and rear gangs pivotally connected together, a generally triangular hitch frame having one side pivoted to one end of the front gang and the other side pivotally connected with the opposite end of the rear gang, a gang angling lever mounted on said front gang, means connecting said lever to said other side of said hitch frame, and means on the tractor connected with said lever so as to swing said gangs into an oppositely angled position when the tractor is turned in one direction.

10. A tractor propelled implement comprising front and rear gangs pivotally connected together, a hitch frame having one side connected to one end of the front gang and a bar connected between the other side of said frame and the opposite end of the rear gang, whereby forward movement of the implement tends to cause said gangs to take an angled position, a gang angling lever connected with said gangs at one side of the pivot therebetween, and a flexible member connected with said tractor in offset relation to said hitch frame and to said gang angling lever, whereby turning the tractor in one direction causes said lever to exert a thrust on both of said gangs so as to cause them to take an oppositely angled position.

11. A tractor propelled implement comprising front and rear gangs pivotally connected together, a hitch frame adapted to be connected with the tractor and pivotally connected with one end of the front gang, a generally longitudinally disposed bar pivotally connected at its forward end to the opposite side of said hitch frame and at its rear end to said rear gang at the end thereof opposite the pivot connection between the hitch frame and the front gang, adjusting latch mechanism carried on the front gang, a lever pivotally mounted at its intermediate portion on said front gang and connected at one end with the hitch frame and longitudinally extending bar adjacent the pivot connection therebetween, releasable latch mechanism carried by said one end of said lever and adapted to be connected to and released from said adjusting latch mechanism, means serving as a releasing lever mounted on the other end of said pivoted lever and operatively connected with said releasable latch means, and means connecting said releasing lever with said tractor, whereby turning of the latter in one direction releases said releasable latch means and swings said pivoted lever for pulling the associated end of the front gang forwardly and forcing the adjacent end of the rear gang rearwardly so as to cause said gangs to roll in the direction of turning of the tractor.

12. A tractor propelled implement comprising front and rear gangs pivotally connected together, a reversible hitch frame connected at one side to one of said gangs and at the other side to the other end of the other gang, whereby forward movement of said implement, with the tractor at either side thereof, tends to cause said gangs to take a position angled in one direction, a latch lever pivotally angled at one end to the opposite end of said one gang and pivotally connected with the adjacent side of said hitch frame, detent mechanism for locking said lever in adjusted position, to determine the angularity between said gangs, said detent mechanism including a pivoted release member, and an operating cable adapted to be connected in either of two positions to said release lever so as to operate the latter with the tractor in either of its positions relative to the implement.

13. A tractor propelled implement comprising front and rear gangs pivotally connected together, a reversible hitch frame connected at one side to one end of the front gang and at the other side to the opposite end of the rear gang, whereby forward travel of the implement tends to cause said gangs to take an angled position, a gang angling lever pivotally anchored to the opposite end of said front gang and connected to the other side of said hitch frame, whereby the position of said lever determines the angularity between said gangs, and means for swinging said lever so as to angle the gangs in the opposite direction to permit the implement to turn in that direction, said means including a turning bar on the tractor and a flexible connection therefrom to the end of said gang angling lever opposite its connection with said hitch frame, the connection between said flexible means and said lever being arranged to have the tractor to turn said lever from either position of the tractor.

14. A disk harrow comprising front and rear gangs, a generally triangular hitch frame having one side pivoted to one end of the front gang, a bar movable relative to the forward gang and connecting the other side of said hitch frame with the rear gang, a gang angling lever pivoted to said front gang, means pivoting the forward end of said bar to said lever, releasable latch means for holding said lever in position, means pivotally connecting said gangs together for movement into and out of angled positions including a member shiftably connected to said rear gang, and means pivotally connecting the rear end of said bar to said shiftable member.

15. A harrow comprising a front section, a rear trailing section pivotally connected to the front section for movement from a position angled relative thereto in one direction into a position angled in the other direction, a latch for fixing said sections in one angled position, a lever pivoted to one section and operatively connected to react against the other section, and draft actuated means attached to said lever, acting through the lever against both sections when they are in one angled position for first releasing said latch and then forcing the sections into an oppositely angled position.

16. A tractor propelled implement comprising front and rear gangs pivotally connected together, a lever pivoted on one gang and connected to the other, latch means on said lever for fixing said gangs in one angled position, means to temporarily release one of said gangs from said latch means, and means connected with the tractor and attached to said lever to automatically actuate said releasing means when the tractor is turned away from the vertex of the angle between the gangs in their one angled position, and acting against one gang and reacting against the other gang through said lever and connections for forcing the gangs into an oppositely angled position.

17. A tractor propelled implement comprising front and rear gangs pivotally connected together, hitch mechanism pivotally connected to the front gang adjacent one end thereof and to the rear gang adjacent the opposite end thereof, a gang angling lever pivotally connected at its intermediate portion to the front gang and connected at one end to said hitch mechanism, an adjustable latching member mounted on the front gang and movable to a plurality of positions, releasable means for connecting and disconnecting said gang angling lever with said latch member, and means connecting the opposite end of said gang angling lever with said tractor so that turning of the latter in one direction after said releasable means has been released will positively force said gangs into an angled position to accommodate said turning of the tractor.

18. A disk harrow comprising front and rear gangs pivotally connected together for movement into and out of angled positions, a hitch frame having one side connected with one end of the front gang and the other side connected with the opposite end of the rear gang, a latch lever pivotally mounted on the front gang and connected with said other side of the hitch frame, detent mechanism for fixing said latch lever to the front gang and cooperating with said hitch frame and the connection of the latter with the rear gang to determine the angled position of both of said gangs, and means attached to said lever for temporarily releasing the connection between the rear gang and said lever.

19. A disk harrow comprising front and rear gangs pivotally connected together for movement into and out of angled positions, a hitch frame having one side connected with one end of the front gang, means connecting the other side of said hitch frame with the opposite end of the rear gang, a latch lever pivotally mounted on the front gang and connected with said other side of the hitch frame, detent mechanism for fixing said latch lever to the front gang and cooperating with said hitch frame and the connection of the latter with the rear gang to determine the angled position of both of said gangs, and means attached to said lever for temporarily releasing the connection between said hitch frame and said latch lever to provide for controlling the rear gang through its connection to the hitch frame and its pivotal connection with the front gang.

20. A harrow comprising a front section, a hitch frame having one side connected to said front section, a rear trailing section pivotally connected to the front section for movement from a normal operating position angled relative thereto in one direction into a position angled in the other direction, a lever pivoted to one section and operatively connected to react against the other section, means connecting the other side of said hitch frame to said lever and means connected to said lever and acting through the lever and said hitch frame against both sections when they are in said normal operating position for forcing the sections into an oppositely angled position for making a turn in the direction away from the point of convergence of the axes of the sections when in said normal operating position.

21. A disk harrow comprising a gang section, a hitch frame pivotally connected to said section at one side thereof, a lever pivotally connecting the other side of said hitch frame to said section, a second lever pivoted to said section, means releasably connecting said levers together and latch means carried by said section and releasably fixing the position of said second lever relative thereto.

22. A tractor propelled disk harrow comprising a gang section having a frame, a hitch frame pivotally connected at one side to one end of said gang frame, a lever pivoted on the other end of said gang frame and connected to the other side of said hitch frame for connecting the latter to said gang frame, releasable latch means mounted on said lever, fixing said lever against movement relative to said gang frame, and means on the tractor for releasing said latch means.

23. A tractor drawn disk harrow comprising a gang section, a hitch frame connected at its forward end to said tractor and at one side to one end of said gang frame for pivotal movement relative thereto, a lever pivoted to the oher end of said gang frame, means pivoting the other side of said hitch frame to said lever at a point spaced toward said one end of the frame from its pivotal connection to the gang frame, releasable latch means fixing the lever against movement relative to said gang frame, and means actuated by a predetermined amount of turning of the tractor relative to said hitch frame for releasing said latch means and swinging said gang section relative to said hitch frame.

24. A disk harrow comprising front and rear gangs, means pivotally connecting said gangs together, comprising bracket means fixed to one of said gangs, companion bracket means pivotally connected to said first bracket means for generally lateral swinging movement, gang angling means connected to said companion bracket at a point spaced from the pivot axis between said bracket means, and means providing for adjustably securing said companion bracket to the other of said gangs in a plurality of lateral positions relative to said pivot axis and said gang angling means.

25. A disk harrow comprising front and rear gangs, each including a frame having front and rear bars, a bracket fixedly secured to one of said bars of one of said frames, companion bracket means pivoted to said first named bracket means, means forming an irregular surface on one of the bars of the frame of the other gang, and clamping means associated with said irregular surface for adjustably securing said companion bracket means to said other gang in a number of laterally adjusted positions.

26. A disk harrow comprising front and rear gangs, means pivotally connecting said gangs together, comprising a bracket fixed to the front gang, a laterally extending bar member, pivot means connecting said bar to said bracket for generally lateral swinging movement, means for adjustably securing said bar member to the rear gang in a plurality of lateral positions, and means for exerting a force in either a forward or a rearward direction against said laterally extending bar.

27. A disk harrow comprising front and rear gangs, means pivotally connecting said gangs together, comprising a bracket fixed to one of said gangs, an attaching member pivotally connected to said bracket, a gang angling bar pivotally connected to said attaching member adjacent one end thereof, and means adjacent said bracket and said gang swinging means for adjustably securing said member to the other of said gangs in a plurality of lateral positions.

28. A disk harrow comprising front and rear gangs, means pivotally connecting said gangs together, comprising bracket means fixed to one of said gangs, companion bracket means pivotally connected to said first bracket means for generally lateral swinging movement, and means providing for adjustably securing said companion bracket to the other of said gangs in a plurality of lateral positions, and mechanism connected between said companion bracket means and said one gang for fixing said gangs against relative swinging movement in either direction.

29. A disk harrow as defined in claim 28 further characterized by said mechanism being adjustable so as to vary the angular relation between the gangs independently of the adjustment of said companion bracket means and said other gang.

30. A tractor propelled implement comprising front and rear gangs swingably connected together for angling movement in a horizontal plane, a tractor hitch member pivotally connected to the front gang adjacent one end thereof, a gang angling lever pivotally connected to the front gang and connected at one end to said hitch member, means connecting said rear gang with said hitch member, an adjustable latching member mounted on the front gang and movable to a plurality of adjusted positions, a releasable latch mounted on said lever for connecting the latter to said latching member, said latch being movable on said gang angling lever between latched and unlatched positions relative to said adjustable latching member, and means connecting said latch with said tractor whereby turning the latter in one direction transmits draft force to said latch, moving the latter to unlatched position, and thereafter said draft force will be applied to said gang angling lever to positively force said gangs into an angled position to accommodate said turning of the tractor.

31. A tractor propelled implement comprising front and rear gangs swingably connected together for movement into and out of angled position relative to each other, a hitch member pivotally connected to the front gang adjacent one end thereof, means for pivotally connecting said hitch member to a tractor, a gang angling lever pivotally connected at its intermediate portion to the front gang and connected at one end to said hitch member, means connecting said rear gang to said hitch member, an adjustable latching member mounted on the front gang and movable to a plurality of adjusted positions, a releasable latch mounted on said gang angling lever for connecting the latter to said latching member, said latch being movable through a limited range between latched and unlatched positions relative to said latching member, a bell crank pivotally mounted on the other end of said gang angling lever and connected to said latch for moving the latter, and a flexible draft member connected to said bell crank and to said tractor at a point on the latter spaced laterally from said hitch member pivot, whereby turning the tractor in one direction first exerts a pull on said bell crank, thereby releasing said latch, and thereafter exerting a pull against said gang angling lever to force said gangs out of said angled position.

CHARLES H. WHITE.